United States Patent
Sugiura et al.

[11] Patent Number: 5,313,286
[45] Date of Patent: May 17, 1994

[54] IMAGE DATA PROCESSING APPARATUS AND METHOD THEREOF

[75] Inventors: Susumu Sugiura, Atsugi; Shigetada Kobayashi, Yokohama, both of Japan

[73] Assignee: Canon Kabushiki Kaisha, Tokyo, Japan

[21] Appl. No.: 539,343

[22] Filed: Jun. 18, 1990

[30] Foreign Application Priority Data

Jun. 21, 1989 [JP] Japan .................................. 1-159316

[51] Int. Cl.$^5$ .......................................... H04N 1/00
[52] U.S. Cl. .................................. 358/443; 358/429; 358/467
[58] Field of Search ............... 358/426, 443, 452, 429, 358/431, 445, 455, 456, 457, 458, 467, 453, 459, 261.3; 382/50, 51, 52, 53, 54, 22

[56] References Cited

U.S. PATENT DOCUMENTS

| | | | |
|---|---|---|---|
| 4,581,762 | 4/1986 | Lapidus et al. | 382/22 |
| 4,648,119 | 3/1987 | Wingfield et al. | 382/27 |
| 4,717,964 | 1/1988 | Abe et al. | 358/298 |
| 4,803,558 | 2/1989 | Hiratsuka et al. | 358/283 |
| 4,837,846 | 6/1989 | Oyabu et al. | 358/456 |
| 4,878,125 | 10/1989 | Katayama et al. | 358/443 |

FOREIGN PATENT DOCUMENTS

| | | | |
|---|---|---|---|
| 198269 | 10/1986 | European Pat. Off. | G06F 15/66 |
| 267571A | 5/1988 | European Pat. Off. | H04N 1/40 |
| 3417118 | 11/1984 | Fed. Rep. of Germany | G06F 3/00 |
| 3638852 | 5/1987 | Fed. Rep. of Germany | H04N 1/00 |
| 2141898 | 1/1985 | United Kingdom | H04N 1/40 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A window of n×m dot is spread over binarized color image data in an original image in order to multi-level-code the binary data for various image processes with respect to the multi-level-coded data. A binary window is re-arranged to determine the number of dots to be printed within the window for re-arrangement of the dots so as to correspond to the dot positions in the original image. When the number of dots to be printed is within the number of dots in the original image, the dots are rearranged so as to correspond to the dot positions in the original image, while on the contrary, when the number of dots to be printed is increased or decreased, the number of dots is accordingly increased or decreased based on a table, in which the priority of dot arrangement is provided. For these reasons, it is possible to perform various image processes to meet the characteristics of a desired binary color printer even if the original image contains binary color data, thereby allowing a good color image suitable for the binary color printer to be produced.

11 Claims, 3 Drawing Sheets

1

IMAGE DATA PROCESSING APPARATUS AND METHOD THEREOF

BACKGROUND OF THE INVENTION

1. Field of the Invention

The present invention relates to an image data processing apparatus and a method of image data processing.

2. Description of the Related Art

Basically, multi-level image data is stored in conventional image data bases such as color image data bases. Therefore, it is possible to perform at will processes such as γ correction or masking for output color printers.

Attention has been shifted to binary color image data bases in terms of a memory capacity for an image data base, processing speeds and the like because the multi-level data increase volumes of data.

A binary color image data base utilizes a method of making a multi-level color image a binary image by means of a binarizing method and of storing the binary image in a data base. With this method, the volume of data is simply reduced to ⅛. Further, data compression together with the above method greatly reduces the volume of data. The data compression efficiency of color images used for business purposes further improves because many color characters, color graphs, etc. are used, while fewer color images are used which have full range of colors.

However, in the above-mentioned example, γ conversion, color processing, black generation and the like for use with a color output printer cannot be effected according to a conventional method, since the color image data is binarized.

That is, because the data is binarized in a "0" or "1" state, the data remains at a fixed value of "0" even if an arithmetic coefficient is multiplied. Thus it is impossible to perform the above-described processes.

Such problems as described above exist not only in binarized image data but also, for example, in three-level-coded or four-level-coded image data.

SUMMARY OF THE INVENTION

In light of the above-described problems, an object of the present invention is to provide a method of image data processing or an image data processing apparatus to perform such as γ conversion processing for n-level image data.

Another object of present invention is to provide a method of image data processing or an image data processing apparatus to perform processes, for example, such as color masking for n-level color image data.

According to the preferred embodiments of the present invention, to achieve the above-mentioned objects, an image data processing method, wherein l-level image data is m-level-coded (l<m) by providing a window of a predetermined size, and wherein the number of dots to be arranged is calculated and re-arranged within a window of a predetermined size, for data having undergone image process computations will be disclosed.

A further object of the present invention is to provide a method of image data processing or an image data processing apparatus to properly process the color image data obtained via transmission lines.

Other features and advantages of the present invention will become apparent from the following Description of the Preferred Embodiments and the attached drawings.

DESCRIPTION OF THE PREFERRED EMBODIMENTS

An embodiment of the present invention which will be described hereinafter discloses the following methods to achieve the aforesaid object and to overcome the problems.

(1) Relatively low resolution of color components are sufficient for human vision, so that windows (openings) based on second dimensions are provided for each color in the binary color data. Among the number of dots (the number of bits at which "1" is set) to be printed within the window, the binary color data is multi-level-coded.

(2) The data which is multi-level-coded in (1) is multiplied by a masking equation used for a conventional color correction to determine the number of dots (the total of dots) to be printed after the color correction is performed.

(3) The number of dots determined in (2) is rearranged as follows:

The dots are arranged so as to be as accurate as possible with respect to the dot positions of the binary data in the original image.

When variations in the number of dots are within the number of dots in the original image, the dots should be arranged so as to correspond to the dot positions in the original image. Further, when the number of dots is increased or decreased, adjustment is made to increase or decrease the number of dots in comparison with a reference table provided.

The above-described embodiment will now be explained in detail with reference to the accompanying drawings.

Figure 1:
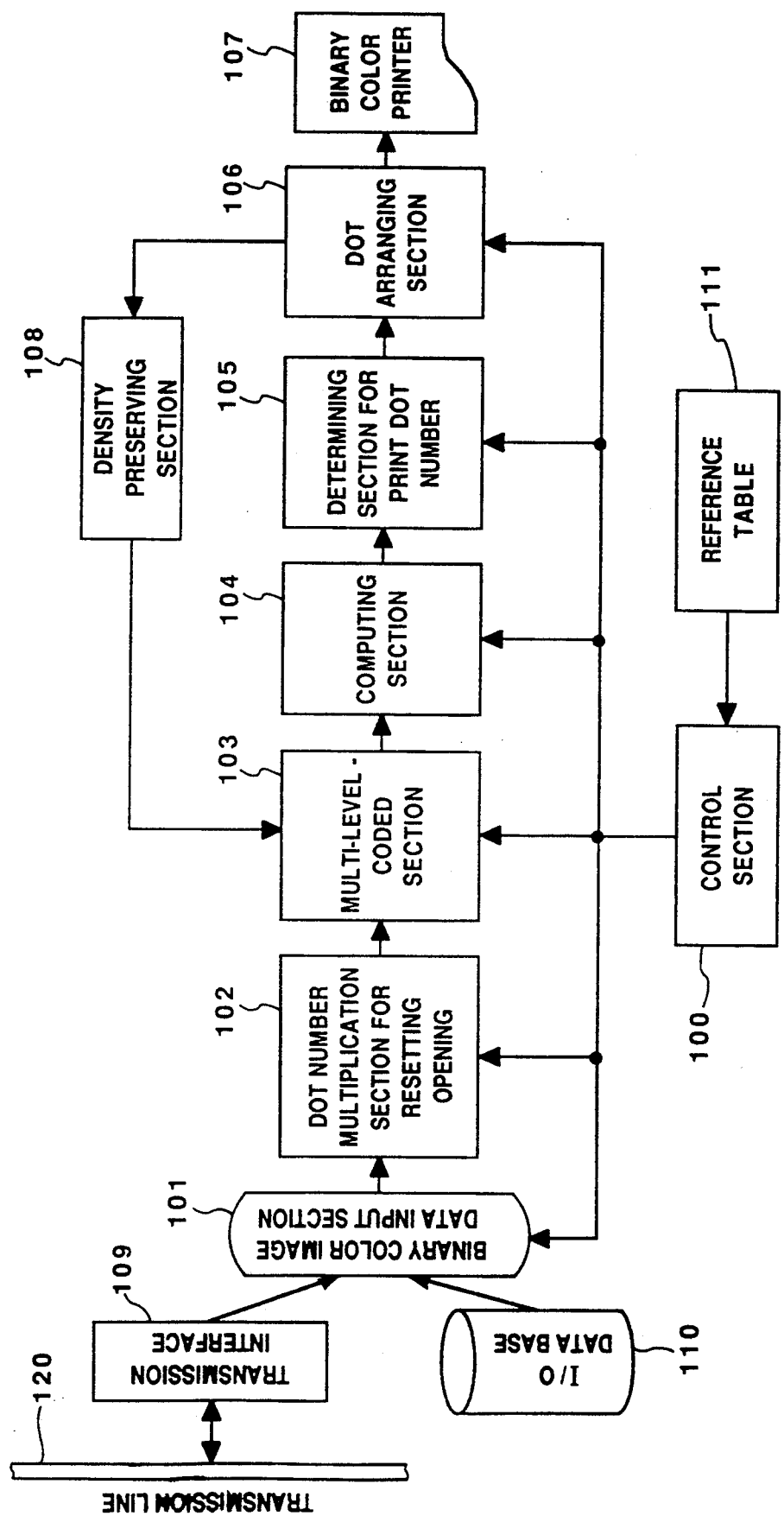
FIG. 1 is a configuration block diagram showing an image data processing apparatus according to an embodiment of the present invention.
Figure 2:
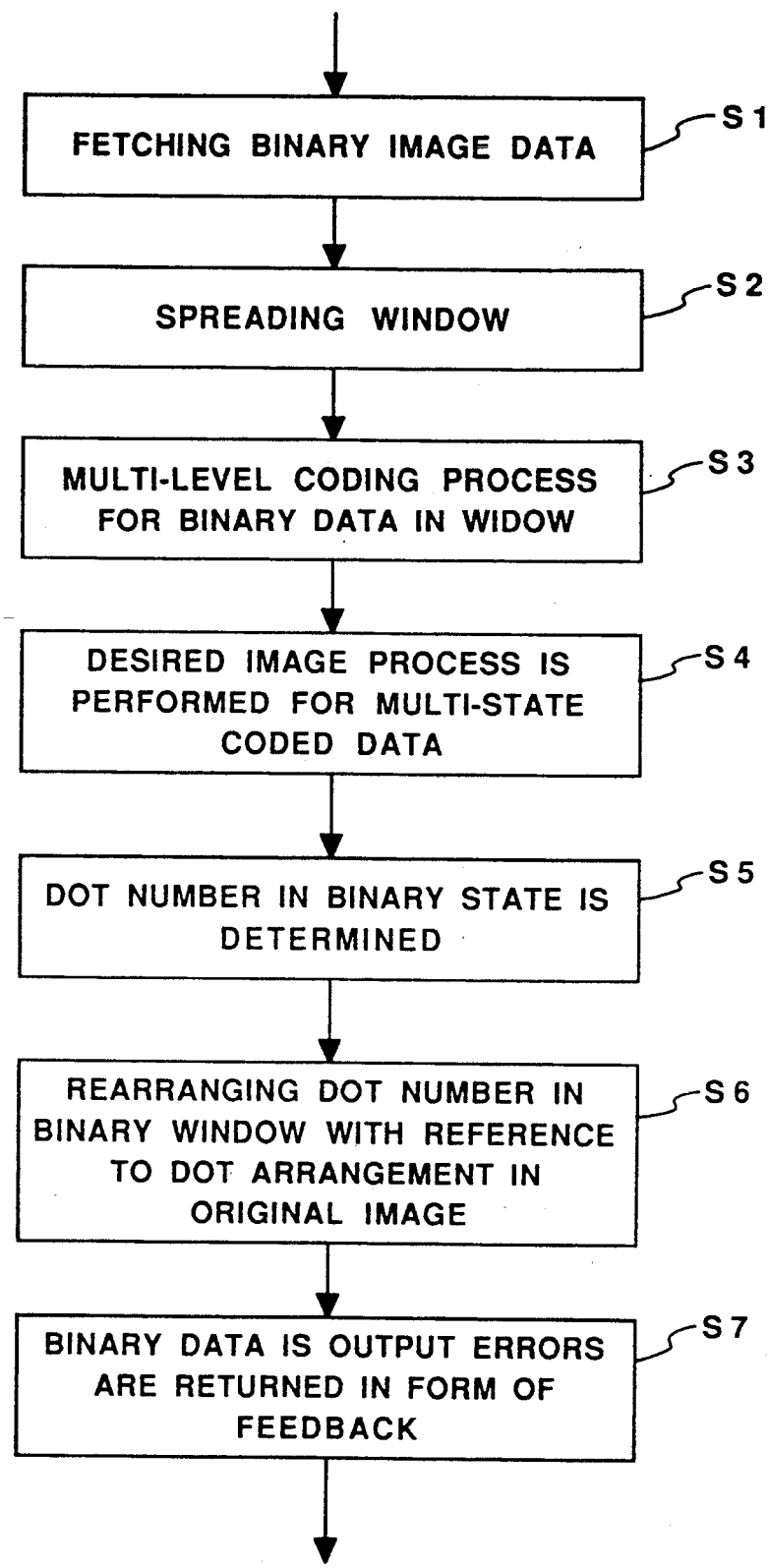
FIG. 2 is a flow chart roughly showing color image processing according to the embodiment of the present invention.

FIG. 1 is a configuration block diagram showing an image data processing apparatus according to an embodiment of the present invention and FIG. 2 is a flow chart showing color image processing according to the embodiment.

Operations for all the sections will now be described with reference to FIGS. 1 and 2.

As shown in FIGS. 1 and 2, a control section 100 controls all the sections in this embodiment. As shown in step S1 of FIG. 2, a binary color image data input section 101 fetches binary color image data to be image-formed sent via a data base 110, a transmission line 120 or a transmission interface 109.

The process shown in step S2 of FIG. 2 for spreading a window over binary color image data is performed in a dot number multiplication section for resetting opening 102. A fixed window, for example, a window of 4 ×

4 dot, is spread over binary color image data which are fetched (drawn out) from the data base 110.

Multi-level coding process shown in step S3 of FIG. 2 is performed in a multi-level coding section 103. The number of original image dots within a given window is multiplied in the multi-level coding process. In this case, the number of dots n to be multiplied is 16 or less, therefore, a multi-level coded data within the window is set to (n/16)×255. 255 is a constant for converting the multi-level coded data into data equivalent to a 8-bit data. This constant is not limited to 255 and other constants may be used. The multi-level coded data having thus undergone the multi-level coding process is further transmitted to a computing section 104, in which image processing, such as γ converting or masking as shown in step S4 of FIG. 2, is performed for the multi-level coded data. Accordingly, new multi-level data, having undergone the image process to meet, for example, the characteristics of a binary color printer 107, is generated The newly generated multi-level data is further transmitted to a determining section so that print dot number 105 may undergo a binarized computing process, as shown in step S5 of FIG. 2. The number of print dots corresponding to the multi-level coded data is determined.

The process shown in step S6 of FIG. 2 is performed in a dot arranging section 106 for determining the number of dots to be printed. This process is performed with reference to the dot arrangement in the original image so as preferably to correspond as exactly as possible to the dot positions in the original image. When the number of dots is further increased or decreased during the determination of the dot number, determination is made based on a dither table or a reference table 111 as to which dots are increased or decreased. In step S7 of FIG. 2, the number of errors generated during the dot rearrangement, particularly the number of errors generated during the multi-level coded - binarized data conversion, is returned in the form of feedback to the multi-level coded section 103 through a density preserving section 108 to be diffused in other picture elements. As a result, the multi-level - binarized data density after the computation is performed is preserved. In step S8, the binary image having thus undergone various processes is transmitted to the binary color printer 107 to be output therefrom.

By the above-described processes, image data which has undergone various processes to meet the characteristics of an output printer and which has been preserved in color binary data can be output as a color image most suitable for a color printer.

Operations for all the sections will now be specifically described with reference to FIG. 3.

Figures 3, 4:
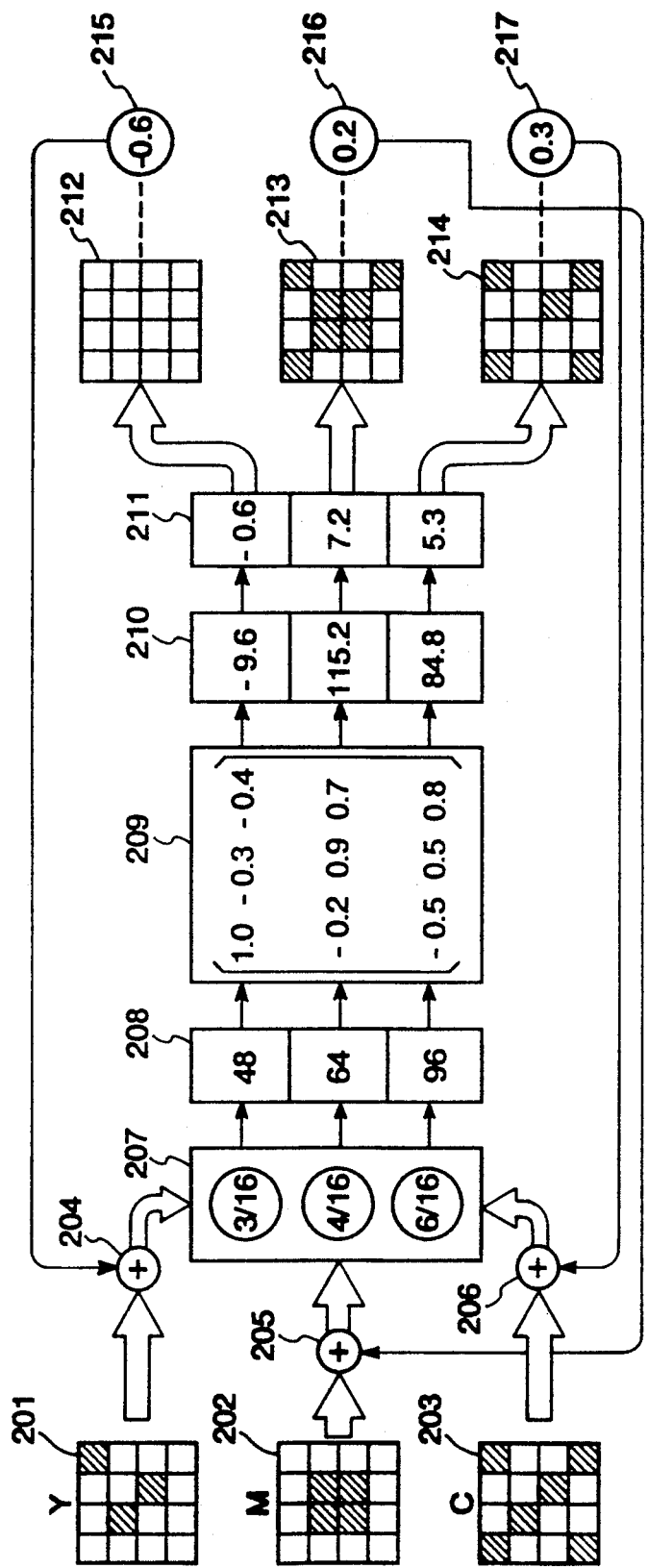
FIG. 3 is a schematic block diagram showing the configuration of the image data processing apparatus shown in FIG. 1, together with specific data processed and progress of the specific data process.
FIG. 4 is a view showing a detailed example of a reference table in accordance with the present invention.

As shown in FIG. 3, numerals 201 to 203 indicate color binarized data stored in the data base 110. Yellow binarized data, magenta binarized data and cyan binarized data for recording ink are designated by Y, M and C, respectively.

Although Y, M and C are utilized as color data in this embodiment, three blocks of color data for red (R), green (G) and blue (B) may also be utilized. In this case, since there is basically such a relationship among the colors as R=1−C, G=1−M, B=1−Y, the color data is utilized by converting one to another at appropriate times as required. At the time of the conversion, in the strict sense, logarithm conversion is also performed.

In the data 201 to 203, the shaded portions indicate dot positions to be printed, while the blank portions indicate dot positions not to be printed.

The binarized color data 201 to 203 are read at the binary color image data input section 101 and then transmitted to the dot number multiplication section for resetting opening 102. The state of the data 201 to 203 in FIG. 3 indicates the state of the data in the original image as seen after a window of 4×4 dot is spread over. In this embodiment, the number of dots is calculated based on the patterns of the data 201 to 203 and the number of dots within the window of 4×4 dot is multiplied and output in addition sections 204 to 206. In the example in FIG. 3, the number of dots in the data 201 is "3", the number of dots in the data 202 is "4" and the number of dots in the data 203 is "6".

Numerals 204 to 206 indicate the addition sections which serve to return errors occurring during dot rearrangement in the form of feedback to the original image data to be added. The addition results for each window of the colors are retained in an addition result retention section 207 and are converted into corresponding multi-level-coded data in a multi-level-coded computing section 208. The addition sections 204 to 206, the addition result retention section 207 and the multi-level-coded computing section 208 correspond to the multi-level-coded section 103 shown in FIG. 1.

At the initial stage of multi-level-coded processing, the errors returned in the form of feedback to the addition section 204 to 206 are all in a "0" state. Thus at the initial stage, the data retention results within the window of the addition result retention section 207 are 3/16, 4/16 and 6/16 at the Y, M and C data, respectively.

These levels are multiplied by 256 in the multi-level-coded computing section 208 for conversion into data corresponding to 8-bit data. As a result, the following is established: Y=48, M=64 and C=96.

The multi-level color data thus multi-level-coded is transmitted to a computing section 209, which corresponds to the computing section 104 shown in FIG. 1, in order to undergo various processes, such as γ conversion, color masking, or interpolating, all of which are performed after the binary color image is multi-level-coded.

As an example of a process which is performed in the computing section 209, color masking will now be described.

The equations shown in the computing section 209 of FIG. 3 represent examples of the coefficient of color correction (masking) for input color data to meet the characteristics of an output color printer.

Although examples of matrix computing of 3×3 dots are shown in FIG. 3, the computing is not limited to this but may also be of secondary masking. The computing may be performed with a multiplier and an adder, or with a ROM table or the like. The level of multi-level data from the multi-level-coded computing section 208 which is computed by matrix conversion in the computing section 209 is output in a buffer 210.

For example, in the case of the Y element shown in FIG. 3, $$Y = 1.0 \times 48 + (-0.3) \times 64 + (-0.4) \times 96 = -9.6$$

In the case of the M and C elements, M=115.2 and C=84.8, respectively. The above data is converted into data corresponding to 8-bit data. The data should be expanded to a dot image with a window of 4×4 dot in order to be printed.

In this embodiment, the number of dots to be printed is determined by a subtracter 211 which corresponds to the determining section for print dot number 105 shown in FIG. 1. Dot images with windows of 4×4 dot shown by numerals 212 to 214 in FIG. 3 are generated. Although an example will now be described in which data is re-binarized with a window of 4×4 dot, the data may be re-binarized with a window of, for example, n x m dot, other than the window of 4×4 dot.

In this embodiment, because of the window of 4×4 dot, the multi-level data retained in the buffer 210 is multiplied by 16 with the subtracter 211 to obtain the values shown in blocks generally denoted by 211 of FIG. 3. The values shown in the blocks indicate the number of dots to be printed or to be deleted within the window of 4×4 dot. Hence, for the Y element, 0.6 (the negative dot number 0.6) dots are deleted from the 4×4 dot matrix. For the M and C elements, 7.2 dots and 5.3 dots are respectively image-formed in each of the 4×4 dot matrixes. However, since neither data with negative dot numbers nor data with dot numbers under a decimal point can be image-formed, the data with a negative dot number is dot-printed as zero, the data with 7.2 dots is dot-printed as 7 dots and the data with 5.3 dots is dot-printed as 5 dots.

The above-described dot re-arrangements should be performed with reference to the original images 201 to 203, so the following embodiment is arranged as close as possible to the dot positions in the original images 201 to 203. In this embodiment, for this purpose, when there are variations in the number of dots in comparison with the number of dots in the original images 201 to 203, the priority for increasing or decreasing the number of dots is assigned based on a reference table 111.

FIG. 4 shows an example of the reference table 111. Numeric values in the reference table 111 correspond to the priority of the dots to be formed within a given matrix when the number of dots in the matrix is increased or decreased as described above.

In this embodiment, when the number of dots rises above the number of dots in the original images 201 to 203, all the dots in the original images 201 to 203 are expanded followed by allocation of the remaining number of dots in accordance with the priority shown in the reference table 111.

When, however the number of dots falls below the number of dots in the original images 201 to 203, the dots in the original images 201 to 203 are sequentially allocated in priority order, and when the dot number reaches the dot number to be printed the dot allocation is completed.

As shown in FIGS. 3 and 4, there are −0.6 dots in the Y element and therefore the −0.6 dots are not printed within a 4×4 dot matrix.

There are 7.2 dots in the M element, so that the four dots in the original image remain intact, and the remaining three dots are allocated as shown by numeral 213 according to the priority shown in the reference table 111. In this description, the first four dots happen to have high order values in the reference table 111, however, dots within a blank portion of the 4×4 dot matrix may be re-arranged in the ascending order of values shown in the reference table 111, even if the reference order is separated from the dot positions in the original image.

Since there are 5.3 dots in the C element and there are 6 dots in the original image, one dot should be deleted. Accordingly, the original image 203 is compared with the reference table 111 to delete a dot in the position of 16 within the reference table 111.

The three blocks of the binary dot data 212 to 214 re-arranged by the above-described adjustment include rounding errors, the density of which cannot be preserved for multi-level-coded data 210 after correction is made, if the rounding errors are ignored. For which reason, these errors should be transmitted to other images, such as the next image element or the next block.

For this reason, these errors are preserved in the density preserving section 108 in FIG. 1 to return them to the multi-level-coded section 103 in the form of feedback. The section indicated by numerals 215 to 217 in FIG. 3 corresponds to the density preserving section 108 in FIG. 1. The errors are returned to the adders 204 to 206 in the form of feedback when binary color data is processed next time around. −0.6 dots for the Y element, 0.2 dots for the M element and 0.3 dots in the C element are added and included when dots in the next window of 4×4 dot are extracted. It is thus possible to preserve the density of the errors.

A binary color correction method for color recording using three-color ink has been hitherto described. It is obvious, however, that γ converting, interpolating or the like can be readily effected with modifications to computation in the computing section 209.

Further, in the above description, although errors occurring in density preserving sections 215 to 217 are returned to the adders 204 to 206 in the form of feedback, they may also be returned to the blocks 211 in the form of feedback, thereby further improving preservation of the density of an image after the process is performed.

Furthermore, in this embodiment, errors are returned first dimensionally and directly, however, errors generated in the density preserving sections 215 to 217 may be second dimensionally convoluted with a filter having a weight coefficient before being diffused. This is a well-known method in diffused matrixes used as in an error diffusion method and is applied in various forms of method.

Moreover, the present invention includes a dot rearrangement method in which deterioration is less likely to occur to a character section or the like by using a Bayer-type diffusion array pattern as the reference table 111.

As has been described, according to the present invention, a window of n x m dot is spread over binarized color image data in order to multi-level-code the binary data for various image processes with respect to the multi-level-coded data. A binary window is re-arranged to determine the number of dots to be printed within the window for re-arrangement of the dots so as to correspond to the dot positions in an original image. For these reasons, it is possible to perform various image processes, such as color correction or γ converting, to meet the characteristics of a desired binary color printer even if the original image contains binary color data, thereby allowing a good color image suitable for the binary color printer to be produced.

Although the present invention has been described mainly for color data, it will become apparent that it may be applied when γ converting or the like is performed to binary black and white data.

Moreover, binary color image data is not limited to data which is input from the data base 110, but it may be communication data received from the transmission line 120 via the transmission interface 109.

As has been described, according to the present invention, it is possible to perform image processes meeting the characteristics of a printer for image data which is provided, for example, as a form of binary data.

The invention has been described in detail with particular reference to the preferred embodiment thereof, but it will be understood that variations and modifications of the invention can be made within the spirit and scope of the invention.

What is claimed is:

1. An image data processing apparatus comprising:
   m-level-coding means for m-level-coding l-level image data (l<m) by providing a first window of a predetermined size;
   computing means for performing predetermined image process computations with respect to image data which is m-level-coded by said m-level-coding means;
   dot number calculating means for calculating the number of dots to be arranged within a second window of a predetermined size with respect to the computing results of said computing means; and
   re-arranging means for re-arranging dot positions within said second window of the predetermined size in accordance with the calculating results of said dot number calculating means and l-level image data of said first window.

2. An image data processing apparatus according to claim 1, wherein said apparatus further comprises a dot array priority memory table which is used during dot rearrangement by said re-arranging means, and during said dot re-arrangement, dots of l-level image data are arranged by said re-arranging means in accordance with dot array within said first window before said l-level image data is m-level-coded by said m-level-coding means, and wherein when the number of dots to be re-arranged is increased or decreased, it is increased or decreased in accordance with dot array priority memory.

3. An image data processing apparatus according to claim 1, wherein said apparatus further comprises error diffusing means for diffusing dot rounding errors which are generated during calculation by said dot number calculating means.

4. An image data processing apparatus according to claim 3, wherein said error diffusing means diffuses said rounding errors by returning said rounding errors in the form of feedback to the m-level-coded process which is performed by said m-level-coding means.

5. An image data processing apparatus according to claim 1, wherein the size of said first window for said l-level image data is substantially the same as the size of said second window for data having undergone said image process computations.

6. An image data processing apparatus according to claim 5, wherein said windows are substantially rectangular.

7. An image date processing method, wherein l-level image data is coded into m-level coded image data, comprising the steps of:
   providing a window of a predetermined size;
   processing l-level image data into m-level coded image data;
   calculating the number of dots to be rearranged in accordance with the processed m-level coded image data;
   re-arranging data of the calculated number within a window of a predetermined size in accordance with a dot arrangement of said l-level image data; and
   diffusing errors which are generated in the calculations.

8. An image data processing method according to claim 7, wherein the calculated number of dots is increased or decreased in accordance with a reference table.

9. An image data processing method according to claim 7, wherein said errors which are generated during said dot number calculation are diffused by feeding back said errors to image data which is not yet m-level-coded.

10. An image data processing method according to claim 7, wherein the size of said window for said l-level image data is substantially the same as the size of said window for data having undergone said image process computations.

11. An image data processing method according to claim 10, wherein said windows are substantially rectangular.

* * * * *

UNITED STATES PATENT AND TRADEMARK OFFICE
CERTIFICATE OF CORRECTION

PATENT NO. : 5,313,286
DATED : May 17, 1994
INVENTOR(S) : SUSUMU SUGIURA, ET AL.

It is certified that error appears in the above-identified patent and that said Letters Patent is hereby corrected as shown below:

ON TITLE PAGE

In [57] ABSTRACT, line 1, "n×m dot" should read --n×m dots--.

COLUMN 1

Line 51, "present" should read --the present--.

COLUMN 3

Line 1, "4 dot," should read --4 dots,--.

COLUMN 4

Line 9, "4×4 dot" should read --4×4 dots--.
Line 12, 4×4 dot" should read --4×4 dots--.
Line 30, "section 204" should read --sections 204--.

COLUMN 5

Line 1, ""4×4 dot" should read --4×4 dots--.
Line 6, "4×4 dot" should read --4×4 dots--.
Line 9, "4×4 dot," should read --4×4 dots,--.
Line 11, "dot," should read --dots,-- and
         "4×4 dot." should read --4×4 dots.--.
Line 13, "dot," should read --dots,--.
Line 18, "4×4 dot." should read --4×4 dots.--.
Line 48, "however" should read --however,--.

UNITED STATES PATENT AND TRADEMARK OFFICE
CERTIFICATE OF CORRECTION

PATENT NO. : 5,313,286
DATED : May 17, 1994
INVENTOR(S) : SUSUMU SUGIURA, ET AL.

It is certified that error appears in the above-identified patent and that said Letters Patent is hereby corrected as shown below:

COLUMN 6

Line 21, "in" should read --for--.
Line 23, "4×4 dot" should read --4×4 dots--.
Line 51, "n×m dot" should read --n×m dots--.

COLUMN 8

Line 16, "date" should read --data--.

COLUMN 5

Lines 21,22,57 & 64, "4X4 dot" should read 4x4 dots--.

Signed and Sealed this

Sixth Day of December, 1994

Attest:

BRUCE LEHMAN

Attesting Officer       Commissioner of Patents and Trademarks